US012775918B1

(12) United States Patent
Baker et al.

(10) Patent No.: US 12,775,918 B1
(45) Date of Patent: Oct. 27, 2026

(54) METHOD AND SYSTEM FOR PORTFOLIO GAMIFICATION

(71) Applicant: Wells Fargo Bank, N.A., San Francisco, CA (US)

(72) Inventors: Dion Eugene Baker, Indian Trail, NC (US); Emily E. Ingham, Waxhaw, NC (US); Jo-kit Patrick Lo, Pineville, NC (US); Marc E. Schwartz, York, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 239 days.

(21) Appl. No.: 18/177,247

(22) Filed: Mar. 2, 2023

(51) Int. Cl.
*G06Q 10/40* (2026.01)
*G06Q 40/06* (2012.01)

(52) U.S. Cl.
CPC ............. *G06Q 10/40* (2026.01); *G06Q 40/06* (2013.01)

(58) Field of Classification Search
CPC ............................... G06Q 50/01; G06Q 40/06
See application file for complete search history.

(56) References Cited

U.S. PATENT DOCUMENTS 7,359,876 B1 * 4/2008 Redpath ................. G06Q 30/06 463/9
8,756,098 B1 * 6/2014 Rizzo ..................... G06Q 10/10 705/7.38
10,930,173 B2 2/2021 Rayat
11,037,209 B2 6/2021 Hayden
11,048,768 B1 * 6/2021 Kolbert ................... H04L 51/52
11,227,335 B2 1/2022 Hayden
12,020,265 B1 * 6/2024 Mao ................... G06Q 30/0243
2015/0317733 A1 * 11/2015 Chibly ................... G06Q 40/04 705/37
2020/0184278 A1 * 6/2020 Zadeh .................... G06N 3/044
2020/0286403 A1 * 9/2020 Kaminski ................ G09B 7/02
2021/0142415 A1 5/2021 Rayat
2024/0257250 A1 * 8/2024 Tso ........................ G06Q 50/01

OTHER PUBLICATIONS

"Digital Badges are Modernizing the Way Financial Advisors Display Their Expertise", Investments and Wealth Institute, (Dec. 20, 2021), 4 pgs.

* cited by examiner

*Primary Examiner* — Jessica Lemieux
*Assistant Examiner* — Nico L Padua
(74) *Attorney, Agent, or Firm* — SCHWEGMAN LUNDBERG & WOESSNER, P.A.

(57) ABSTRACT

Examples are directed to systems and methods that bridge the gap between users and an entity. A metric associated with an article used by social media user is received. The metric is compared with a plurality of thresholds and then a variable indicium is assigned to the social media user. The variable indicium is assigned based on the comparison of the metric with the plurality of thresholds. The variable indicium varies with different thresholds of the plurality of thresholds. Training data associated with the variable indicium is provided to a machine learning algorithm to create the variable indicium. The machine learning algorithm is updated over time with additional variable indicium such that the machine learning algorithm for creating the variable indicium changes over time. A forward-facing element that is engageable to view the articles used by the social media user to achieve the metric is also generated.

21 Claims, 8 Drawing Sheets

METHOD AND SYSTEM FOR PORTFOLIO GAMIFICATION

BACKGROUND

Social media platforms have become a primary source of information for many users. Social media platforms allow users to post comments, share photographs, and post links to news or other content on the Internet. Furthermore, entities are able to target an audience and deliver advertisements directly to a targeted audience. In some cases, entities can indicate that they have expertise in a particular subject matter area for the purpose of enticing users to purchase their products or use their services. For example, a user can state that they have expertise in financial advising with the intent of enticing others to use them for financial advising. However, a user is not precluded from making assertions about their level of expertise without providing any type of proof with the hopes that someone viewing their assertions will want to retain the services of the user. Thus, the user advertising their services in financial advising may, in reality, have little financial advising expertise.

In addition, some social media users may lack the inclination to access certain services, products, and entities that are associated with these services and products. Thus, there is no way to bridge a gap between social media users and entities that provide the services and products.

Therefore, what is needed is a system and method that solves the problems of bridging the gap between social media users and entities that can provide services and products to the social media users.

SUMMARY

Examples relate to a system and method that can bridge the gap between followers of social media users and an entity that provides services and products. A social media user, who may have a large number of followers, can have achievement information associated with them that is presented on a social media platform. The achievement information can include first variable indicium relating to a certification that represents a first achievement level that the social media user has achieved. The first achievement level can be determined based on metrics associated with the social media user. The variable indicium can be assigned to the social media user from an entity separate from the social media user. The achievement information can also include a forward-facing element, which is engageable and redirects a user to the entity that certified the social media user and assigned the first variable indicium. The entity can provide articles, such as products and services, the social media user employed to reach the first achievement level where the followers may be unaware of the products. The entity can provide information relating to the assignment of the variable indicium to the social media user.

The variable indicium can be variable based on different achievement levels where a second variable indicium varies from the first variable indicium. The second variable indicium can correspond to a second achievement level that can either be greater than the first achievement level or less than the first achievement level. The variable indicium can be assigned to social media users based on the social media users meeting metric thresholds associated with each of the variable indicium.

In additional examples, a system and method can rank users against each other. The users can be filtered into groups according to information for each of the users, such as financial knowledge, financial goals, demographic information, and the like. Users in each of the groups can be ranked against each other based on a fiscal performance of each of the users. Here, tools that each of the users employ to achieve their given fiscal performance can be accessible to all of the users in order to encourage other users to employ the tools used by those who have achieved increased fiscal performance.

DETAILED DESCRIPTION

Figure 1:
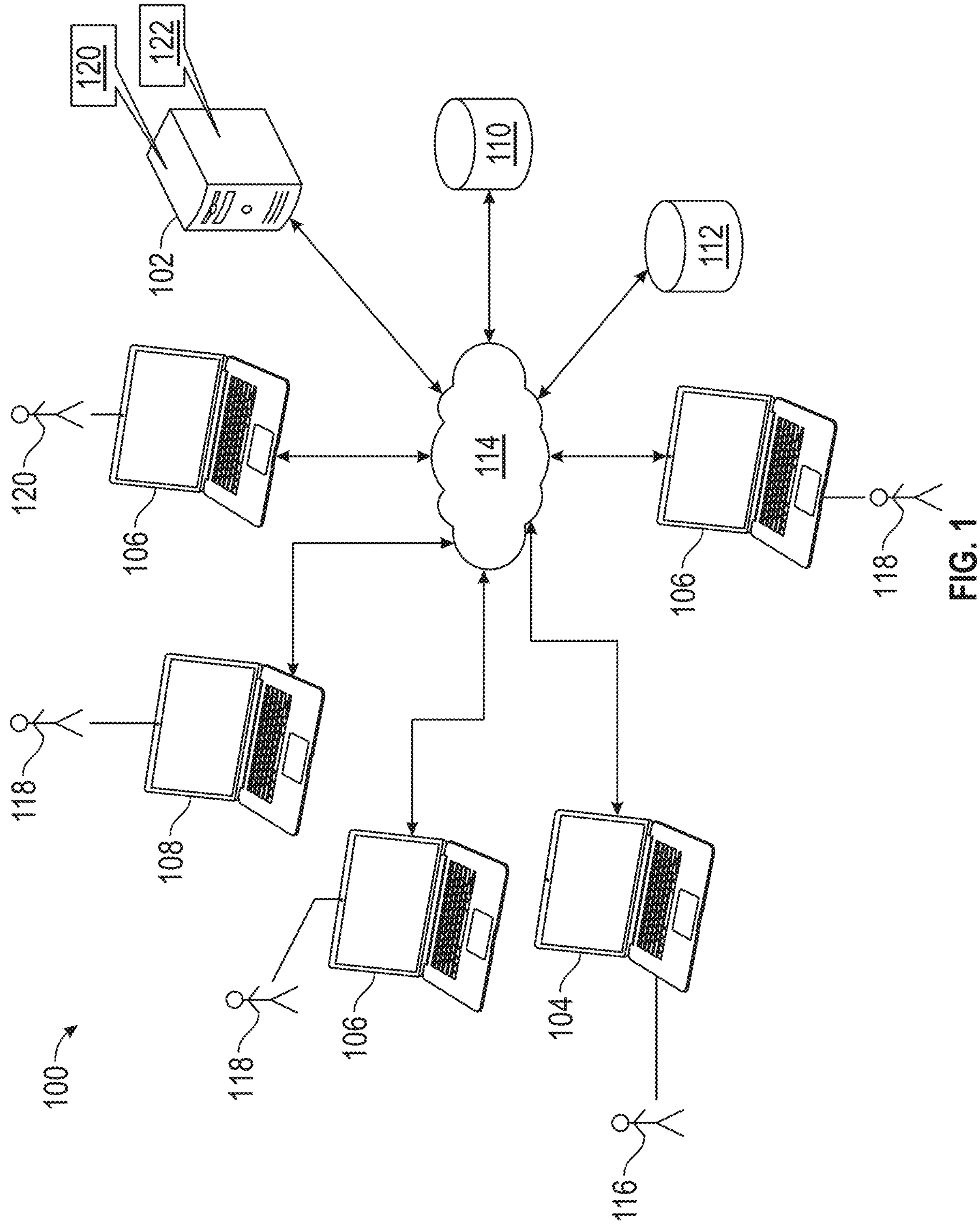
FIG. 1 shows an environment in which examples may operate, in accordance with some examples.

Examples relate to a system and method that can bridge the gap between followers of social media users and an entity that provides services and products. A social media user, who may have a large number of followers, can have achievement information associated with them that is presented on a social media platform. The achievement information can include first variable indicium relating to a certification that represents a first achievement level that the social media user has achieved. The first achievement level can be determined based on metrics associated with the social media user. The variable indicium can be assigned to the social media user from an entity separate from the social media user. The achievement information can also include a forward-facing element, which is engageable and redirects a user to the entity that certified the social media user and assigned the first variable indicium. The entity can provide articles, such as products and services, the social media user employed to reach the first achievement level where the followers may be unaware of the products. The entity can provide information relating to the assignment of the variable indicium to the social media user.

A social media user may have a certain level of notoriety and therefore appeal to members of a given demographic. As such, the social media user can have several followers from the given demographic on various social media platforms.

The social media user may also have achieved a certain level of success in a subject matter area that the given demographic may have a minimal level of understanding. To further illustrate, the social media user may be considered an expert in fashion where the social media user posts fashion ideas on several social media platforms. The social media user may also be a successful fund manager (FM) at an entity, such as a financial institution. In their capacity as a FM, the social media user can have attained a first achievement level with a high volume of mutual funds where the social media user has outperformed the Standard & Poor's 500 Index (S&P 500) by five percent over the past six months. Based on the success of the social media user, the entity may have assigned a variable indicium to the social media user that reflects the first achievement level. The variable indicium can be a graphic that correlates to the first achievement level, i.e., outperforming a benchmark by a given percentage. The variable indicium can correspond to a medal, a gemstone, or the like. The variable indicium can be a means that bridges the gap between the followers associated with the given demographic who would normally have very little exposure to products and services provided by the entity via the social media user. In particular, followers of the social media user can be intrigued by the variable indicium and select the variable indicium, thereby redirecting them to the entity that assigned the variable indicium along with exposing the followers to the products and services offered by the entity.

The variable indicium, such as a medal, can be displayed on a profile page of the social media user on various social media platforms. Accordingly, when followers of the social media user access the profile page of the social media user, the followers will see the variable indicium on the profile page. Moreover, the profile page of the social media user can include a forward-facing element. Followers can select the forward-facing element and can be redirected to an entity, such as the financial institution at which the social media user is a FM. The forward-facing element can be a quick read (QR) code, a live link, a hyperlink, or the like.

When the followers select the forward-facing element, the followers will be redirected from the profile page to the entity, such as a webpage associated with the financial institution. When the followers are redirected to the entity, the products that the social media user uses in their capacity to achieve the level of success denoted by the variable indicium can be presented to the followers. Since the social media user achieved the first achievement level with mutual funds, the followers can be presented with information pertaining to mutual funds offered by the entity.

In further aspects, when the followers are redirected to the entity, the followers may be asked to provide information, such as financial knowledge, financial goals, demographic information, and the like. In addition to presenting information associated with the mutual funds, the entity can offer other products, such as the use of financial advisors (FAs) and other investment tools, based on the information provided by the followers.

Now making reference to FIG. 1, a network environment 100 is shown in which examples can operate. The network environment 100 can include a server device 102 associated with an entity, such as a financial institution, a device 104 associated with a first social media user, devices 106 associated with social media followers, and a device 108 associated with a second social media user. The network environment 100 can also include an internal database 110, an external database 112, and a network 114. The network 114 can facilitate communication between the server device 102, the devices 104-108, the internal database 110, and the external database 112.

The server device 102 and the devices 104-108 can incorporate an architecture that facilitates operation in the capacity of either a server or a client machine in server-client network environments, where each of these devices may be implemented as any type of computing device, such as a server computer, a personal computer (PC), or the like each having a processor configured to perform the subject matter disclosed herein. The devices 104-108 can be any computing device suitable for use by a user, such as social media users and social media followers. For example, the devices may be a desktop computer, a tablet computer, a portable media device, or a smart phone belonging to a user.

The internal database 110 and the external database 112 can be any data storage resource and may store data structured as a text file, a table, a spreadsheet, a relational database (e.g., an object-relational database), a triple store, a hierarchical data store, or any suitable combination thereof. Moreover, the internal database 110 and the external database 112 can be combined into a single machine, database, or device, and the functions described herein for any single machine, database, or device may be subdivided among multiple machines, databases, or devices.

The internal database 110 and the external database 112 can store data for a first social media user 116 associated with the user device 104. The internal database 110 and the external database 112 can also store data for a second social media user 118 associated with the user device 108. The data can include articles, which are used by the first social media user 116 and the second social media user 118, to perform duties in their respective capacities at the financial institution associated with the server device 102. The articles can include stocks, bonds, mutual funds, exchange traded funds (ETFs), annuities, securities, derivatives, futures, options, swaps, commodities, currencies, and the like. In addition, a single article can relate to assets managed by a social media user and can include any combination of stocks, bonds, mutual funds, EFTs, annuities, securities, derivatives, futures, options, swaps, commodities, currencies, and the like. The data can also include performance metrics of the first social media user 116 along with performance metrics of the second social media user 118 in association with each of the articles. To further illustrate, for mutual funds, the data can include the performance of mutual funds managed by the first social media user 116 and the second social media user 118 relative to a benchmark, such as the S&P 500.

The performance metric can relate to how articles managed by the first social media user 116 and the second social media user 118 perform in comparison to the benchmark, such as outperforming the benchmark or not performing as well as the benchmark. The performance metric can also relate to how an article managed by the first social media user 116 compares to an article managed by the second social media user 118 e.g., mutual funds managed by the first social media user outperform mutual funds managed by the second social media user and vice versa.

The performance metrics can be compared against different thresholds that can correspond to different achievement levels. In scenarios where the first social media user 116 manages a mutual fund, the performance metric can relate to the performance of the mutual fund in comparison to a benchmark, where different thresholds can correspond to different achievement levels. To further illustrate, outperforming a benchmark by five percent can correlate to a first threshold, outperforming a benchmark by ten percent can correlate to a second threshold, and outperforming a benchmark by fifteen percent can correlate to a third threshold. Similarly, the performance metric can relate to how individuals perform relative to each other. To further illustrate, outperforming others by five percent can correlate to a first threshold, outperforming others by ten percent can correlate to a second threshold, and outperforming others by fifteen percent can correlate to a third threshold.

The first threshold can correspond to a first achievement level while the second threshold can correspond to a second achievement level different from the first achievement level. Additionally, the third threshold can correspond to a third achievement level that is different from the first achievement level and the second achievement level. An entity, such as a financial institution, can certify a user, such as a social media user, that attained any of the achievement levels. An entity can provide a first certification to a user, such as the first social media user 116 or the second social media user 118, based on the user achieving the first achievement level. An entity can provide a second certification to a user, such as the first social media user 116 or the second social media user 118, based on the user achieving the second achievement level. Likewise, an entity can provide a third certification to a user, such as the first social media user 116 or the second social media user 118, based on the user achieving the third achievement level.

As part of the certification process, an entity can provide a variable indicium that can correlate to the achievement level. The variable indicium can be variable based on the achievement levels being variable, e.g., outperforming the benchmark by five percent, ten percent, fifteen percent, etc. A first variable indicium can correspond to the first achievement level, a second variable indicium can correspond to the second achievement level, and a third variable indicium can correspond to the third achievement level. Examples of the variable indicium can include gemstones where, when a user achieves the first achievement level, the user is assigned a sapphire and when a user achieves the second achievement level, the user is assigned a ruby and, when a user achieves the third achievement level, the user is assigned a diamond. Further examples can include precious metals where, when a user achieves the first achievement level, the user is assigned a silver coin, when the user achieves the second achievement level, the user is assigned a gold bar and, when the user achieves the third achievement level, the user is assigned a platinum bar. While gemstones and precious metals are described, any type of indica can be used for the variable indicium, such as medals, e.g., bronze, silver and gold, dollar signs, a single dollar sign for the first achievement level, two dollar signs for the second achievement level, and three dollar signs for the third achievement level, and the like. Furthermore, while only three achievement levels are described, any number of achievement levels are envisioned. In addition, the internal database 110 and the external database 112 can store the variable indicium that can be associated with the different performance metrics for the first social media user 116 and the second social media user 118.

The variable indium can change when an achievement level of a user changes. To further illustrate, if the first social media user 116 is a FM and outperforms the benchmark by five percent during a first time period where outperforming by the benchmark by five percent correlates to the first achievement level, the first social media user 116 can be assigned a silver coin. However, if during second time period, the first social media user 116 outperforms the benchmark by fifteen percent, which correlates to the third achievement level, the variable indium, i.e., the silver coin, can be changed to a platinum bar. Thus, the variable indicium can be a first indicium at the first performance metric, i.e., five percent better than the benchmark, and is configured to change to another indicium when the metric changes to another metric, i.e., fifteen percent better than the benchmark.

The network 114 can be any network that enables communication between or among machines, databases, and devices (e.g., the server device 102, the first social media user device 104, the social media followers devices 106, the second social media user device 108, the internal database 108, and the external database 12). Accordingly, the network 114 can be a wired network, a wireless network (e.g., a mobile or cellular network), or any suitable combination thereof. The network 110 may include one or more portions that constitute a private network, a public network (e.g., the Internet), or any suitable combination thereof. Accordingly, the network 114 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 114 can communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

The server device 102 can include an application 120 that can be configured to carry out the methods and disclosure described herein. The application 120 can be associated with the entity and can be a machine learning algorithm that can be used to create variable indicium over time, assign variable indium over time where the variable indicium can change over time as described herein, and assign achievement levels using performance metrics, where the performance metrics can change over time, as discussed herein. In the benchmark example above, machine learning algorithms can be provided with training data relating to comparing a performance of a mutual fund with a benchmark and determining a difference between the performance and the benchmark, such as the mutual fund outperforming the benchmark by ten percent. Here, the training data can relate to the performance data of the mutual fund and the benchmark along with the difference between the performance data and the benchmark. Machine learning algorithms can be trained over time with data relating to updating the achievement levels and the variable indicium assigned to the achievement levels. For example, if a majority of FMs at a financial institution start to outperform the benchmark by five percent, then the machine learning algorithm can be retrained to learn that outperforming the benchmark by five percent is no longer the first achievement level since a majority of the FMs at the financial institution outperform the benchmark by five percent. Thus, the machine learning algorithm can be retrained to indicate that when a user, such as a FM, outperforms the benchmark by ten percent, this correlates to the first achievement level. Likewise, the machine learning algorithm can be retrained to indicate that when a user, such as a FM, outperforms the benchmark by fifteen percent, this correlates to the second achievement level and when a user outperforms the benchmark by twenty percent, this now can correlate to the third achievement level.

One or more machine learning algorithms are generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with input and, optionally, users. The statistical model is trained based on multiple attributes (or factors) described herein. In machine learning parlance, such attributes are referred to as "features." To generate and train a statistical model, a set of features is specified and a set of training data is identified.

Examples are not limited to any particular machine learning technique for generating/training/retraining a machine learning model. Example machine learning techniques include linear regression, logistic regression, neural networks, random forests, naive Bayes, and Support Vector Machines (SVMs). Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

Machine learning can also envision the use of fuzzy matching where fuzzy matching can use various inbuild matching algorithms (a blend of probabilistic, heuristic, linguistic, phonetic, and/or empirical methods) based on the type of data being matched, with built-in algorithms for phonetic spellings and partial fields. This combination of approaches provides great flexibility and generates accurate results.

Initially, the number of features that are considered for training may be significant. After training a machine learning model and validating the model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features with little predictive power may be removed from the training data. Removing such features can speed up the process of training future models and computing output scores.

Figure 2:
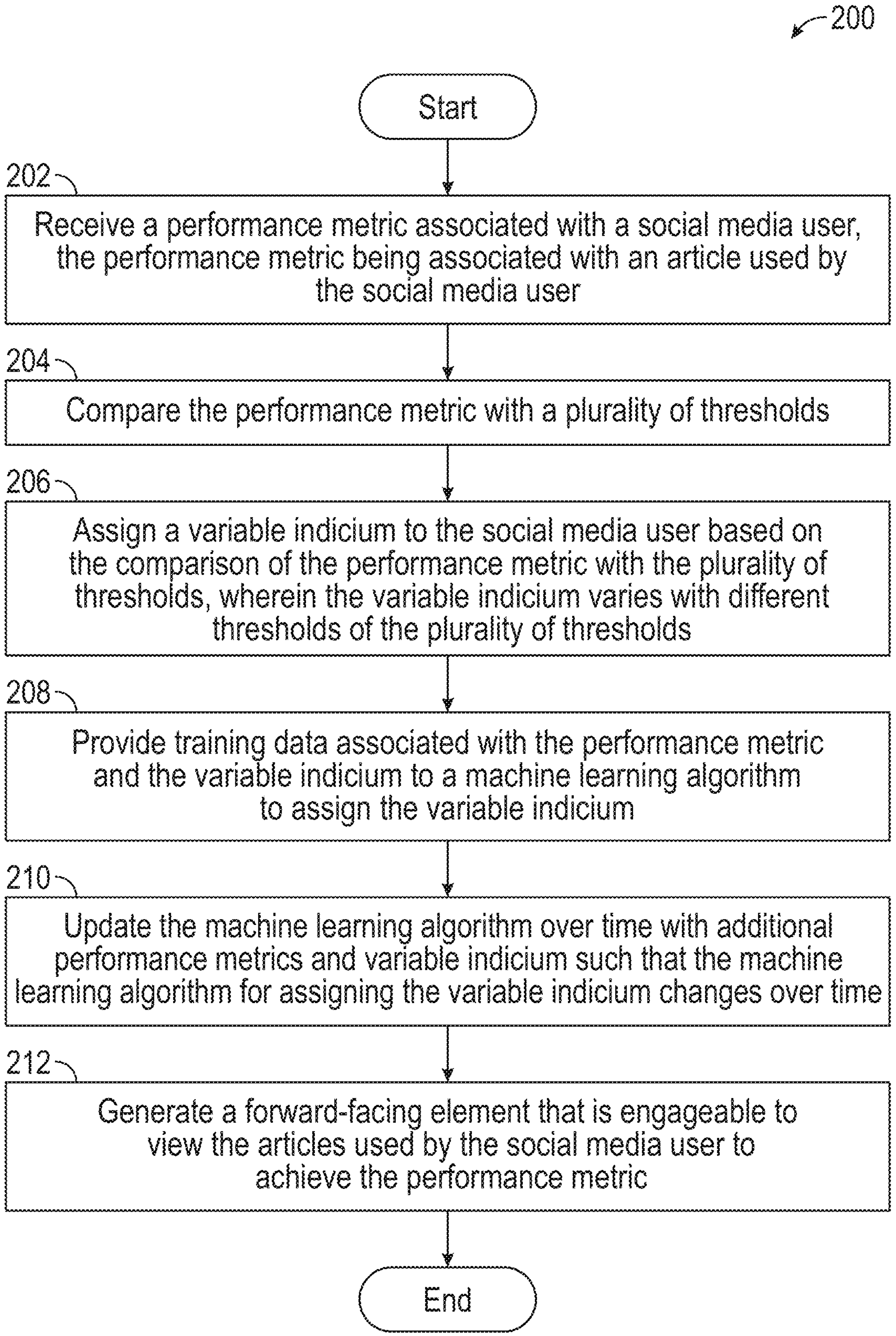
FIG. 2 illustrates a method that exposes followers of a social media user to an industry about which the followers have little knowledge in accordance with some examples.
Figure 3:
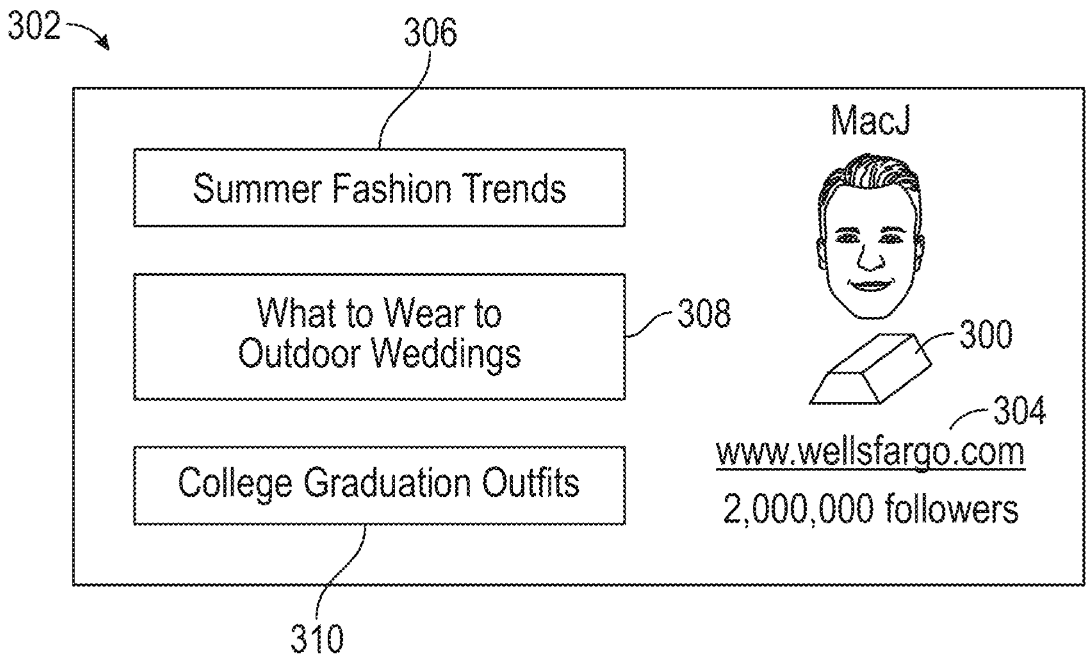
FIG. 3 shows a profile page of a social media user, in accordance with some examples.

As mentioned above, examples relate to bridging the gap between social media users and entities that provide services and products. In examples, the gap can be bridged by providing an indication relating to a certification on a profile page of a social media user who has several followers. The social media user may be an influencer where the social media user has other users that follow the social media user on different social media platforms used by the social media user. In an example, referred to herein as "the example," the first social media user 116, MacJ, has expertise in the fashion industry and has profile pages across several social media platforms. The profile pages provide fashion advice where followers can interact with the profile pages to receive fashion advice. MacJ is also a FM at a financial institution and has achieved a certain level of success as a FM. However, many of MacJ's followers have little knowledge of the financial industry much less products and services that financial institutions can provide. Examples leverage MacJ's expertise as a FM at a financial institution to expose followers of MacJ to products offered by the financial institution. FIG. 2 illustrates a method 200 that exposes followers of a social media user to an industry about which the followers have little knowledge.

During an operation 202 of the method 200, a performance metric associated with a social media user is received. The performance metric can be associated with an article used by the social media user. The article can correspond to one of the articles described above and the performance metric can be based on the performance of the article used by the social media user.

Once the performance metric is received during the operation 202, the performance metric is compared with a plurality of thresholds during an operation 204. The thresholds can correspond to an achievement level associated with the social media user in relation to the article. As discussed above, performance metrics can be compared against different thresholds that can correspond to different performance achievement levels. In particular, the performance metric can relate to the performance of an article in comparison to a benchmark, where different thresholds can correspond to different performance metrics. The benchmark can include the S&P 500, the Bloomberg U.S. Aggregate Bond Index, or the like.

Based on the comparison during the operation 204, a variable indicium can be assigned to the social media user during an operation 206. As discussed above, the variable indicium can vary with different thresholds of the plurality of thresholds. Thus, if the performance metric meets a first threshold but not a second threshold, the social media user is assigned a first variable indicium during the operation 206. If the performance metric meets the second threshold but not a third threshold, the social media user is assigned a second variable indicium during the operation 206. If the performance metric meets the third threshold, the social media user is assigned a third variable indicium during the operation 206. The variable indicium can be stored in a database and provided to a social media user by an entity who issued the variable indicium. The variable indium can be displayed on a profile page of the social media user on the various social media platforms.

The variable indicium can be selectable to show a user/follower of the social media user who selected the variable indicium how the social media user achieved the variable indicium. Upon selecting the variable indicium, the user/follower can be redirected from a profile page of the social media user to a web page associated with the issuer of the variable indicium. The web page can list the metrics that were accomplished by the social media user to achieve the variable indicium. The metrics can include a performance of a portfolio managed by the social media user in comparison to a benchmark and a time period associated with the performance. The metrics can also include a trading volume of the social media user along with a general comparison of the social media user to other users, such as if the social media user is outperforming their peers.

Turning to the example, MacJ manages a portfolio that includes twenty-five percent stocks, thirty percent mutual funds, thirty percent bonds, and fifteen percent ETEs. The portfolio is outperforming a benchmark that includes a similar portfolio distribution by eleven percent that can be represented as a performance metric. During the operation 202, the performance metric relating to outperforming the benchmark by eleven percent is received by the server device 102.

In the example, the plurality of thresholds can include a first threshold of outperforming a benchmark by five percent, a second threshold of outperforming a benchmark by ten percent, and a third threshold outperforming a benchmark by fifteen percent. During the operation 204, the application 120 compares the performance metric relating to outperforming the benchmark by eleven percent with the plurality of thresholds. The application 120 determines that the performance metric meets the second threshold of outperforming a benchmark by ten percent.

During the operation 206, a variable indicium is assigned to MacJ based on the comparison of the performance metric outperforming the benchmark by eleven percent with the plurality of thresholds. In the example, the variable indicium relates to precious metals where, when a user achieves the first achievement level, the user is assigned a silver coin, when the user achieves the second achievement level, the user is assigned a gold bar, and when the user achieves the third achievement level, the user is assigned a platinum bar. Since MacJ meets the second threshold, the application 120 assigns MacJ a variable indicium 300 corresponding to a gold bar during the operation 206. The variable indicium 300 can be stored in the internal database 110 and the external database 112 for use at a later time. Moreover, MacJ can place the variable indicium 300 on a profile page 302. In particular, the server device 102, via the application 120, can send the variable indicium 300 to the profile page 302. The profile page 302 can be hosted on any social media platform, such as LinkedIn™, Instagram™, Facebook™, and the like.

Figure 4:
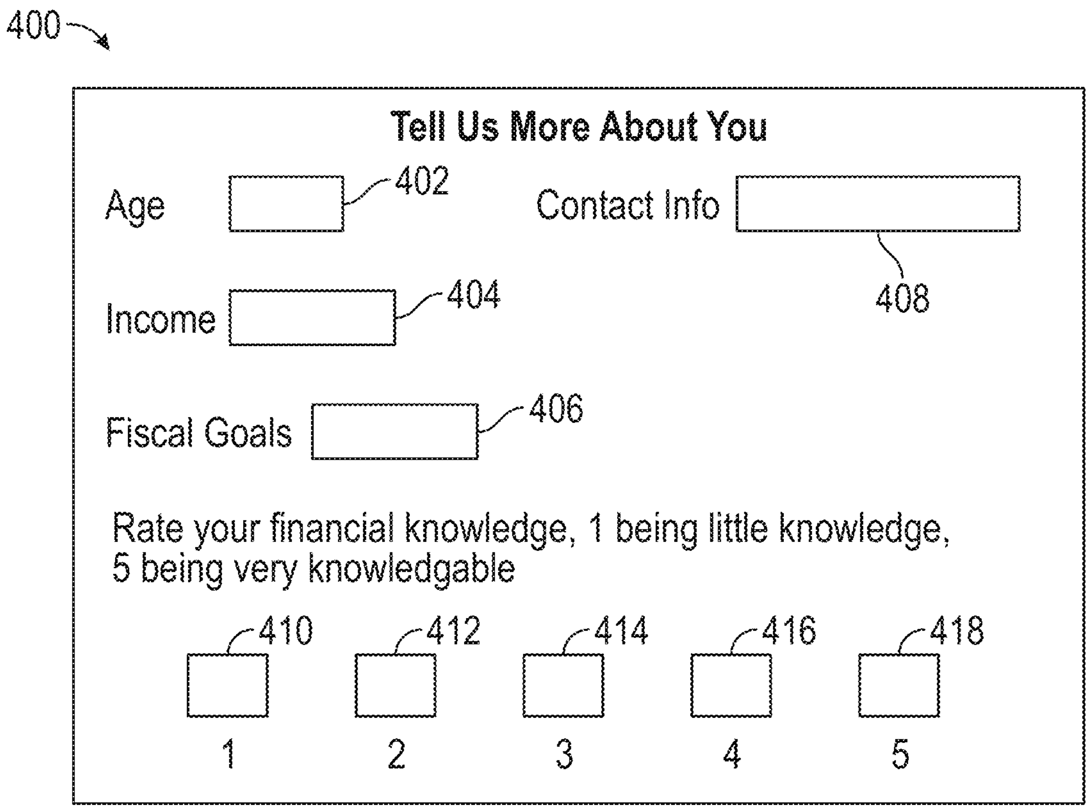
FIG. 4 illustrates a web page of the social media user of FIG. 3, in accordance with some examples.

The variable indicium 300 is selectable by a user, such as a follower of MacJ, to show the user how MacJ achieved the variable indicium 300. When the user selects the variable indicium 300, the user is redirected from the profile page 302 to a webpage 400 curated by the financial institution with which MacJ is a FM, as shown at FIG. 4. The web page 400 can include fields 402-408 where the user can provide demographic information. At the field 402, the user can provide age information relating to the user and at the field 404 the user can provide income information. At the field 406, the user can provide fiscal goal information. The fiscal goal information can include data such as an expected retirement date, a net worth goal, a savings goal, or the like. At the field 408, the user can provide contact information, such as a telephone number, an email address, social media contact information, or the like.

Moreover, the webpage 400 can also include inputs 410-418 where the user can provide a rating for their financial knowledge. If the user has very little financial knowledge, the user can select the input 410. If the user feels that they are financially savvy, the user can select the input 418. Financial knowledge can include knowledge of various financial services, such as the use of FAs, FMs, and the like. Financial knowledge can also include familiarity with various products, such as the articles listed above.

Figure 5:
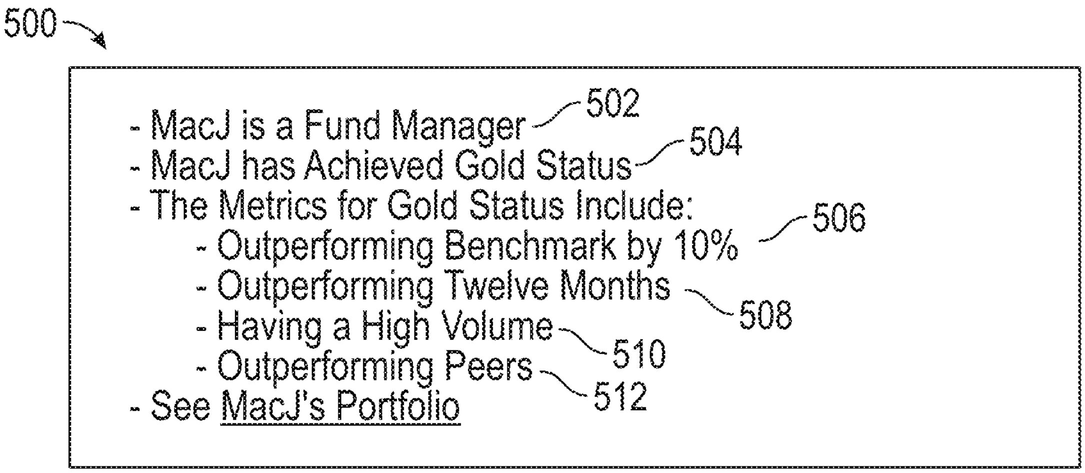
FIG. 5 is a web page listing criteria for a variable indicium shown in FIG. 3, in accordance with some examples.

Still sticking with the example, once the user provides information at the webpage 400, the financial institution can direct the user to a webpage 500, as shown at FIG. 5. The webpage 500 can indicate a title 502 that MacJ has the financial institution, which, in the example, is a FM. The webpage 500 can also indicate that MacJ has achieved gold status at 504, which can correspond to the variable indicium 300, and can list the metrics 506-512 used to assign the variable indicium 300. The metrics can include a performance of a portfolio managed by the social media user in comparison to a benchmark 506 and a time period 508 associated with the performance. The metrics can also include a trading volume 510 of the social media user along with a general comparison 512 of the social media user to other users, such as the second social media user 118, and if the social media user is outperforming their peers. Therefore, a user can see that a financial institution has given MacJ the variable indicium 300, thereby increasing a legitimacy associated with the variable indicium 300 in the eyes of the followers of MacJ.

Returning attention to FIG. 2 and the method 200, after the variable indicium is assigned during the operation 206, the method 200 can perform an operation 208, where training data associated with the performance metric and the variable indicium can be provided to a machine learning algorithm. Here, the training data, i.e., the performance metric and the variable indicium, can be used to train a machine learning algorithm such that the machine learning algorithm can be used to assign a variable indicium.

After the method 200 performs the operation 208, the method 200 can perform an operation 210, where the machine learning algorithm can be updated over time with additional performance metrics and variable indicium, such that the machine learning algorithm that can be used for assigning variable indicium can change over time. In examples, is more and more users, such as FMs, are achieving a performance metric over time, such as outperforming a benchmark by five percent, the machine learning algorithm can learn that since more FMs are outperforming the benchmark by five percent, outperforming the benchmark is no longer an achievement. Thus, the machine learning algorithm can learn, i.e., be retrained, to reassign a different value to the first achievement level, such as increasing the threshold from five percent to ten percent. The learning algorithm can accomplish these features using the techniques described above.

Returning to the example, during the operation 208, the server device 102 can provide the performance metric associated with MacJ and the variable indicium corresponding to the gold bar to a machine learning algorithm 122 as training data. Furthermore, the server device 102 can update the machine learning algorithm 122 over time with performance metrics associated with MacJ or the second social media user 118 along with the variable indicium assigned based on the performance metrics such that the machine learning algorithm 122 can change over time during the operation 210.

Returning attention to FIG. 2 and the method 200, after updating the machine learning algorithm during the operation 210, the method 200 performs an operation 212, where a forward-facing element that is engageable to view the articles used by the social media user to achieve the performance metric is generated. The forward-facing element can be a live link, a hyperlink, a QR code, or the like. Where the forward-facing element is a live link or a hyperlink, the server device 102 can employ any type of hypertext system that implements a presentation level, a hypertext abstract machine level, and a database level to create live links and hyperlinks. Where the forward-facing element is a QR code, the server device 102 can create any type of QR code, such as an IQR code, a secure QR code, a frame QR, a High Capacity Colored 2-Dimensional, or the like, using any well-known, suitable techniques known to those skilled in the art during the operation 208. For example, the QR code can be created using any well-known QR code generator that uses application programming interfaces to automatically fuse and encode data into graphic designs. Examples include QRTiger, QRSTUFF™, QRD.BY, Visualead™, FORQR, or the like.

The forward-facing element can be generated and stored in a database for later retrieval by a social media user where the forward-facing element can be displayed on a profile page of the social media user on various social media platforms. The forward-facing element can be engageable to display articles such as those listed above used by the social media user to achieve the performance metric. In addition to displaying the articles used by the social media user to achieve the performance metric, in instances where the social media user has a portfolio with more than one article, the selection of the forward-facing element can show the distribution of the articles in the portfolio of the social media user along with a value assigned to the performance metric.

Turning attention back to the example, during the operation 212, the application 120 generates a forward-facing element 304 that corresponds to live link www.wellsfargo-.com. The application 120 can send the forward-facing element 304 to the profile page 302. When a user engages the forward-facing element 304, the user can be directed to a user interface 600 that is curated by the financial institution for which MacJ is a FM. The user interface 600 displays articles 602-608 of MacJ's portfolio, the performance of which garnered the variable indicium 300 for MacJ. Moreover, the user interface 600 shows a distribution of the articles 602-608 in a portfolio managed by MacJ. Thus, the article 602, which are stocks, comprise thirty-five percent of the portfolio managed by MacJ. Additionally, the article 604, which are mutual funds, comprise thirty percent of the portfolio managed by MacJ and the article 606, which are bonds, comprise thirty percent of the portfolio managed by MacJ. As shown in the user interface 600, the portfolio managed by MacJ also includes the article 608, which are ETEs and comprise five percent of the portfolio.

Figure 7:
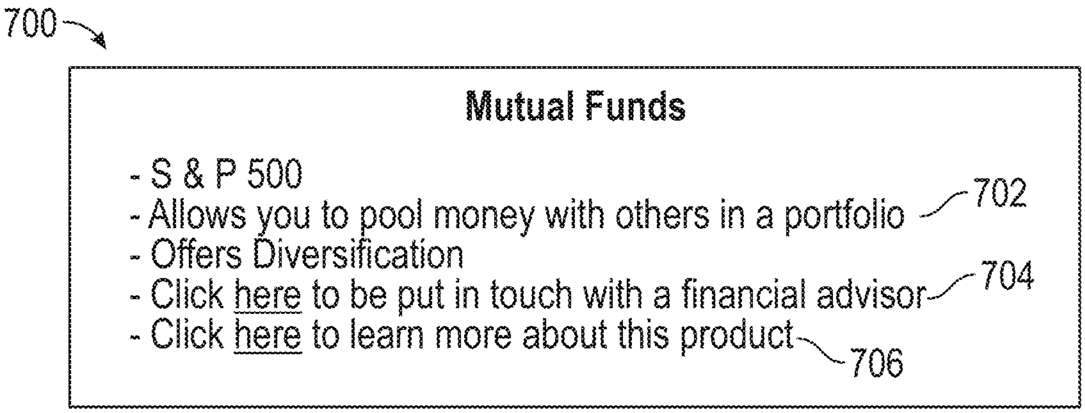
FIG. 7 is a user interface that provides information regarding articles shown in FIG. 6, in accordance with some examples.

In the example, the articles are individually selectable such that a user can learn more information about the article. Thus, if a user is interested in mutual funds, the user can select the article 604. When the user selects the article 604, the financial institution for which MacJ is a FM provides a user interface 700, as shown in FIG. 7. At the user interface 700, the user is provided with information 702 relating to mutual funds, such as the fact that mutual funds tend to track the S&P 500, allows users to pool their money with others in a portfolio, and offers diversification. In addition, the user interface 700 provides an input 704 to allow the user to be put in touch with a FA. Furthermore, the user interface 700 includes an input 706 that allows a user to learn more about mutual funds. While FIG. 7 shows information relating to mutual funds, it should be noted that other webpages can be presented when a user selects any of the articles associated with the articles 604-608.

By virtue of providing the option to learn more about articles and being put in touch with FAs, FMs, and the like, examples bridge the gap between followers of social media users and entities that provide services and products. In particular, followers of MacJ may be interested in fashion suggestions provided by MacJ, such as summer fashion trends 306, fashion suggestions for outdoor weddings 308, or college graduation outfit suggestions 310. By virtue of providing the variable indicium 300 and the forward-facing element 304 on the profile page 302 of MacJ, followers who may not have any inkling of financial products or financial services are exposed to financial products and financial services. Moreover, followers are shown how MacJ was assigned the variable indicium 300, which bolsters a credibility of MacJ.

As noted above, examples can rank users against each other. The users can be filtered into groups according to information for each of the users, such as financial knowledge, financial goals, demographic information, and the like. Users in each of the groups can be ranked against each other based on a fiscal performance of each of the users. Here, tools that each of the users employ to achieve their given fiscal performance can be accessible to all of the users in order to encourage other users to employ the tools used by those who have achieved increased fiscal performance. To further illustrate the principles of ranking users against each other, reference is made to FIG. 8.

Figure 8:
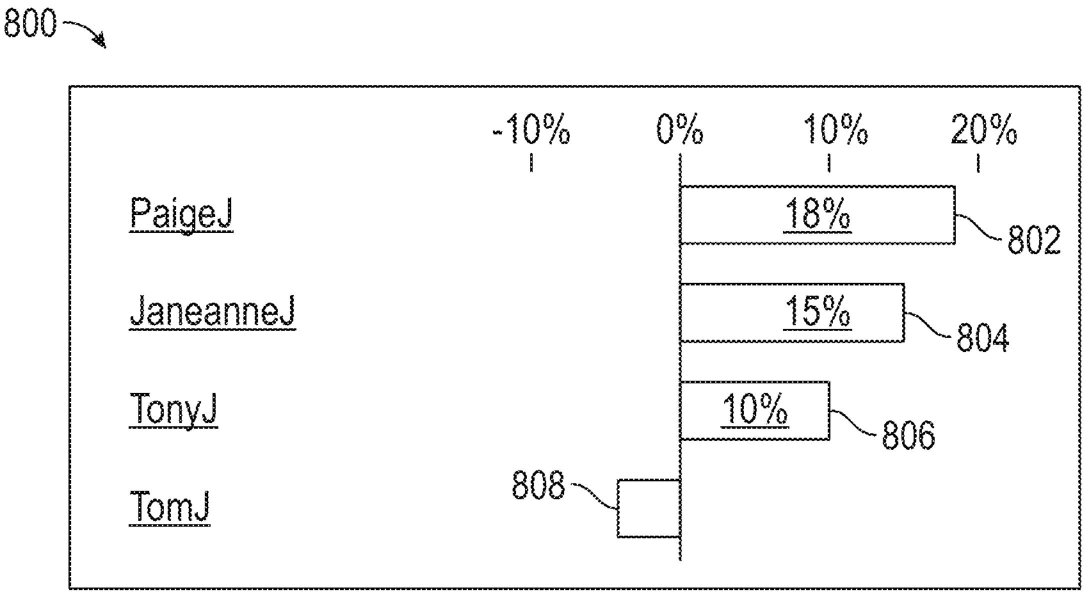
FIG. 8 illustrates a user interface, which ranks users against each other, in accordance with some examples.

FIG. 8 illustrates a user interface 800, which ranks users PaigeJ, JaneanneJ, TonyJ, and TomJ against each other. Based on demographic information, such as age and income, each of the users PaigeJ, JaneanneJ, TonyJ, and TomJ are filtered into the same group. Each of the users PaigeJ, JaneanneJ, TonyJ, and TomJ have financial portfolios with the same financial institution, where the financial institution, via the server device 102, the application 120, and the machine learning algorithm 122, can rank the users PaigeJ, JaneanneJ, TonyJ, and TomJ against each other using any well-known ranking algorithm.

Figure 9:
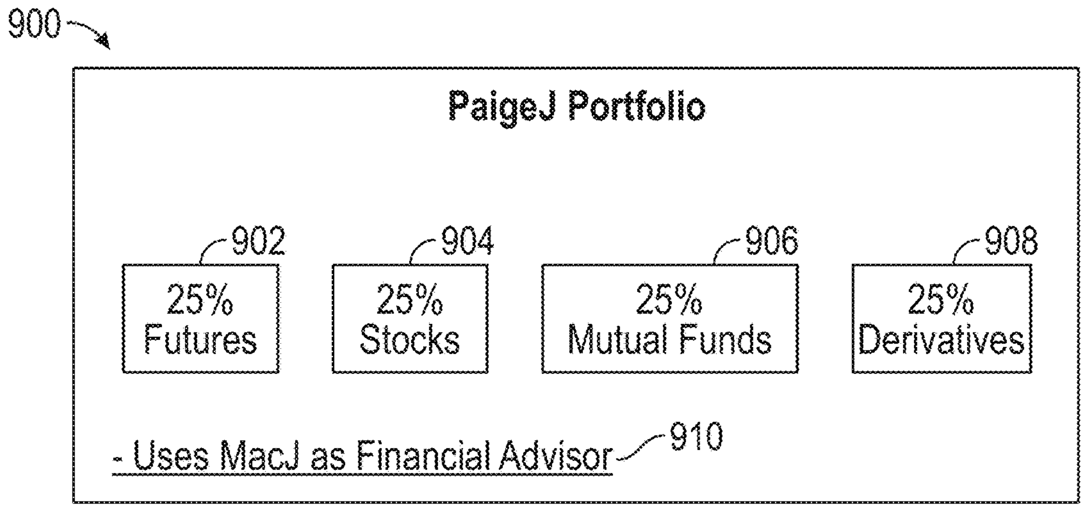
FIG. 9 is a portfolio associated with one of the users ranked in FIG. 8, in accordance with some examples.

The users PaigeJ, JaneanneJ, TonyJ, and TomJ can be ranked against each other based on the performance of their portfolios relative a benchmark. The user interface 800 can include selectable indica 802-808 that shows the performance of the respective portfolios against a benchmark. For example, PaigeJ's portfolio is outperforming the benchmark by eighteen percent while JaneanneJ's portfolio is outperforming the benchmark by fifteen percent. Furthermore, TonyJ's portfolio is outperforming the benchmark by ten percent and TomJ's portfolio is underperforming the benchmark by three percent. Here, if TomJ would like to mimic the performance of PaigeJ's portfolio, TomJ can select the selectable indicium 802 to view PaigeJ's portfolio 900, as shown FIG. 9.

The portfolio 900 includes articles 902-908 where the article 902 corresponds to futures and comprises twenty-five percent of the portfolio 900 and the article 904 corresponds to stocks and comprises twenty-five percent of the portfolio 900. The portfolio 900 also includes the article 906 corresponds to mutual funds and comprises twenty-five percent of the portfolio 900 and article 908 corresponds to derivatives and also comprises twenty-five percent of the portfolio 900. The portfolio 900 also shows that PaigeJ uses MacJ as her FA at 910. TomJ can decide to adjust his portfolio to mimic the portfolio 900 and increase the performance of his portfolio. In addition, the indication 910 is selectable such that if TomJ decides he would like to use MacJ as a FA, TomJ can select the indication 910 in order to contact MacJ.

Figure 6:
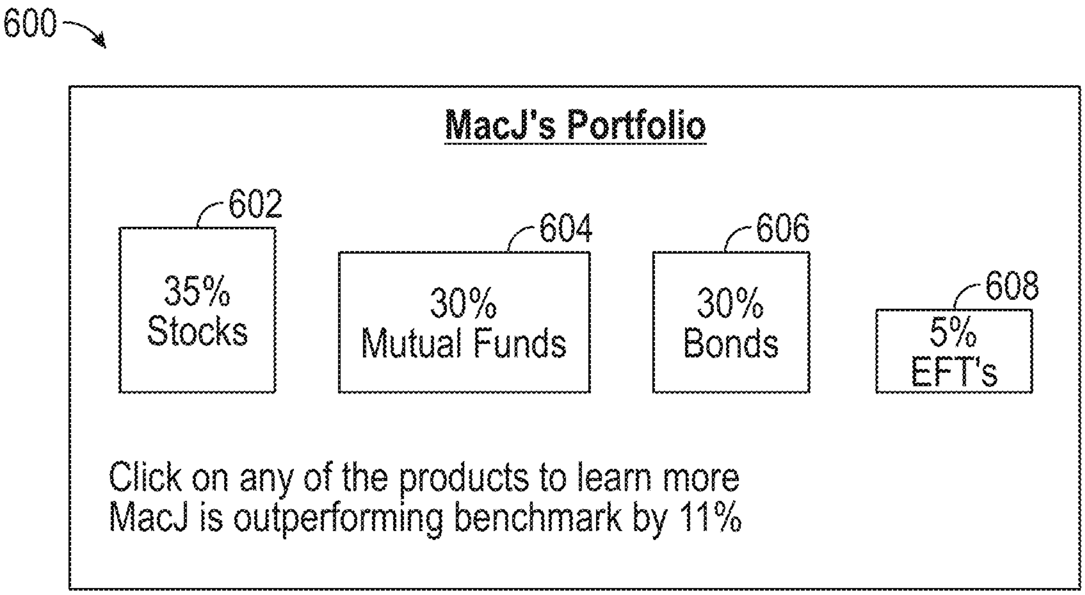
FIG. 6 is a user interface that provides details for a portfolio of the social media user of FIG. 3, in accordance with some examples.
Figure 10:
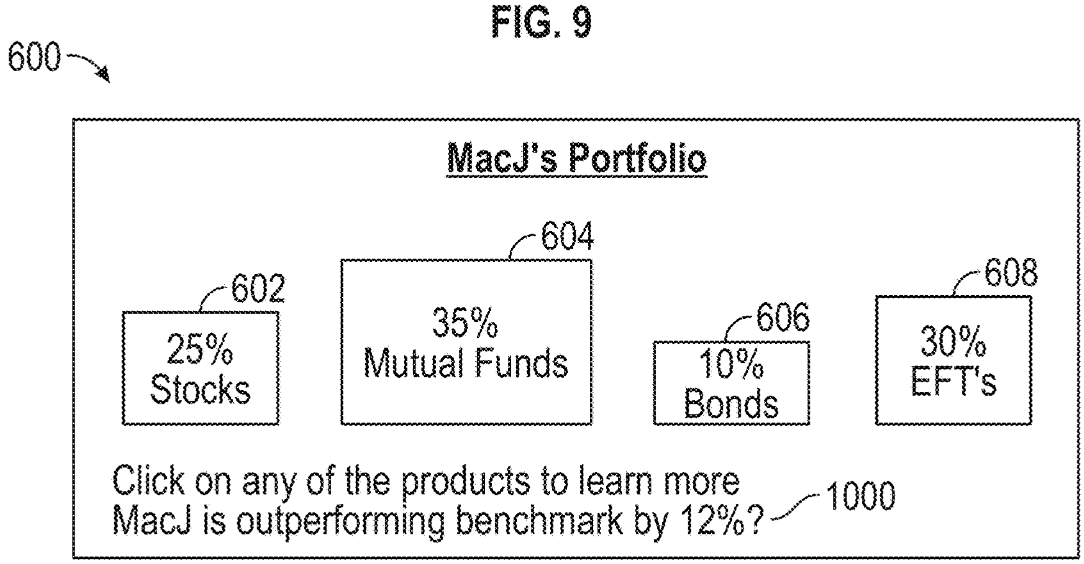
FIGS. 10 and 11 illustrate an adjusted version of the user of FIG. 6, in accordance with some examples.

As noted above, when followers of MacJ see that MacJ has success as a FM by virtue of the variable indicium 300 and the explanation of the variable indicium 300 displayed on the user interface 500, followers of MacJ may adjust article allocation of Mac's portfolio to determine how the performance metric may change. In particular, in FIG. 6 and the user interface 600, MacJ's portfolio includes the articles 602-608. A user may adjust the allocation of the articles 602-608 such that the article 602 comprises twenty-five percent of the portfolio, the article 604 comprises thirty-five percent of the portfolio, the article 606 comprises ten percent of the portfolio, and the article 608 comprises thirty percent of the portfolio, as shown in FIG. 10 and the user interface 600. Here, based on the adjustment to the allocations associated with the articles 602-608, an indication is made at 1000 that MacJ's portfolio is now outperforming the benchmark by twelve percent.

Figure 11:
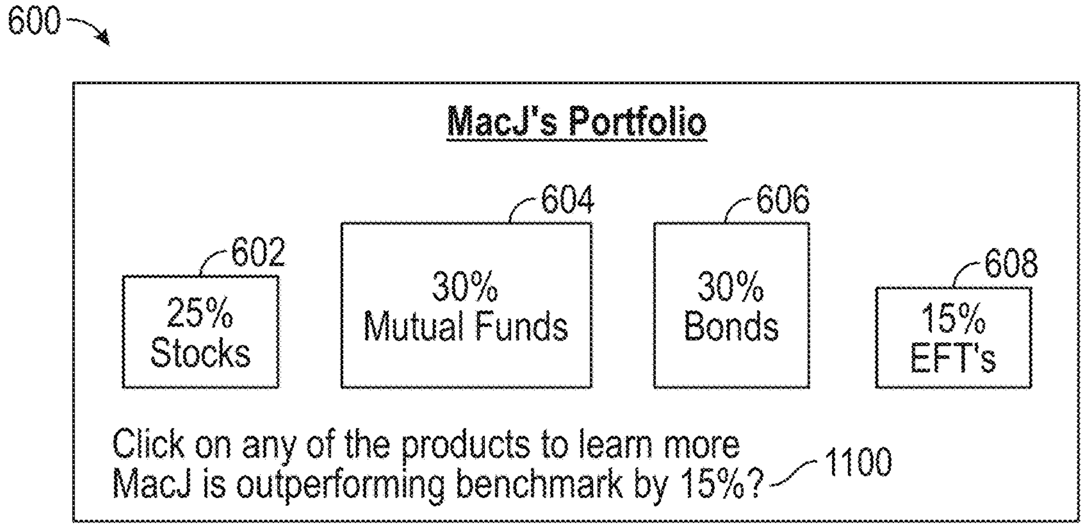

Furthermore, a user may adjust the allocation of the articles 602-608 such that the article 602 comprises twenty-five percent of the portfolio, the article 604 comprises thirty percent of the portfolio, the article 606 comprises thirty percent of the portfolio, and the article 608 comprises fifteen percent of the portfolio, as shown in FIG. 11 and the user interface 600. Based on the adjustment to the allocations associated with the articles 602-608, an indication is made at 1100 that MacJ's portfolio is now outperforming the benchmark by fifteen percent. Thus, when a user adjusts a configuration of one of the articles 602-608, a configuration of the other of the articles 602-608 changes in proportion to the adjustment of the configuration of the one of the articles 602-608.

Figure 12:
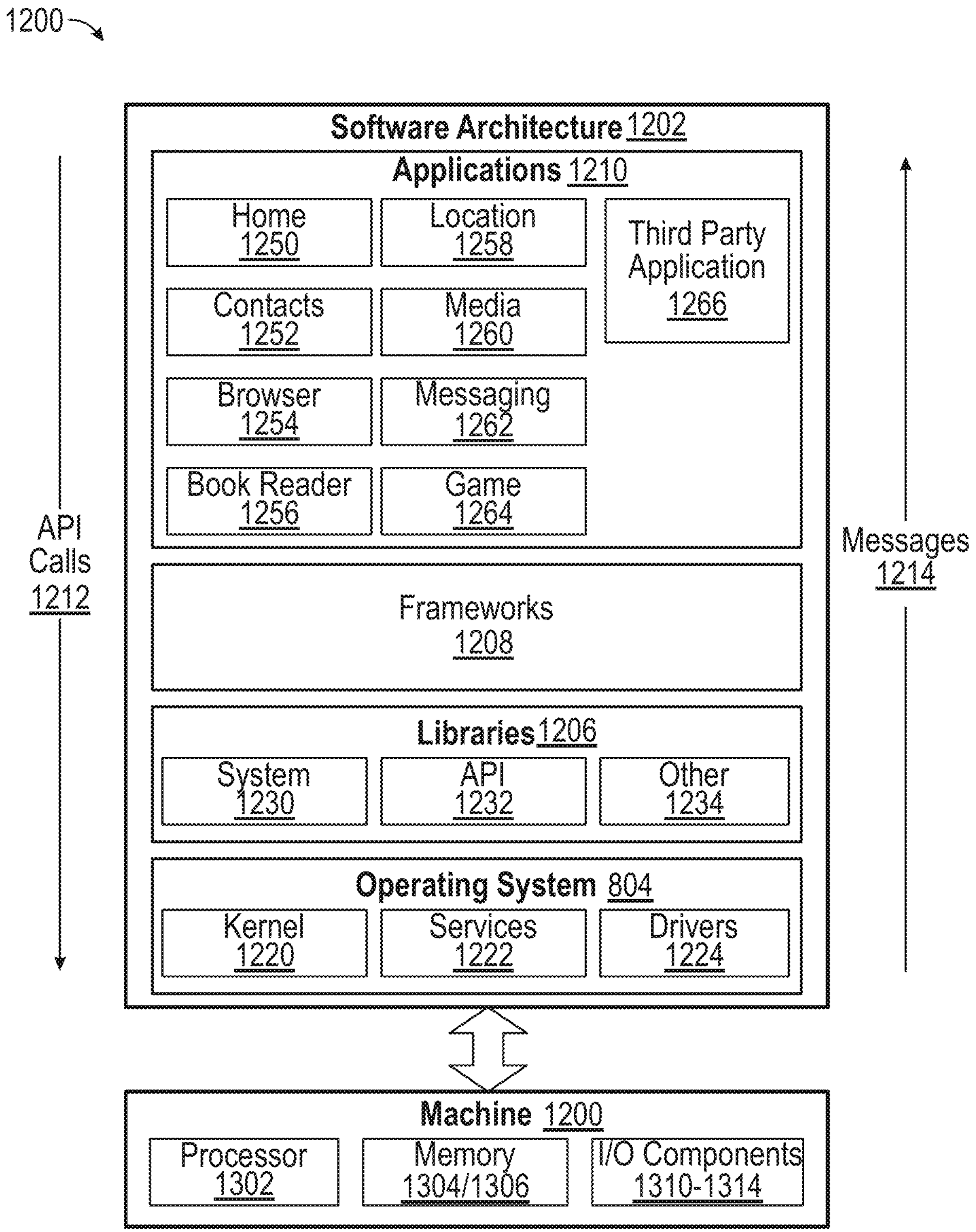
FIG. 12 is a block diagram illustrating an example of a machine upon which one or more examples may be implemented.

FIG. 12 is a block diagram 1200 illustrating a software architecture 1202, which may be installed on any one or more of the devices described above. FIG. 12 is merely a non-limiting example of a software architecture, and it will be appreciated that many other architectures may be implemented to facilitate the functionality described herein. The software architecture 1202 may be implemented by hardware such as a computer system 1300 of FIG. 13 that includes a processor 1302, memory 1304 and 1306, and I/O components 1310-1314. In this example, the software architecture 1202 may be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, according to some implementations.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers in some implementations. For example, the kernel 1220 provides memory management, processor management (e.g., scheduling), component management, networking, and security settings, among other functionality. The services 1222 may provide other common services for the other software layers. The drivers 1224 may be responsible for controlling or interfacing with the underlying hardware. For instance, the drivers 1224 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 1206 provide a low-level common infrastructure that may be utilized by the applications 1210. The libraries 1206 may include system libraries 1230 (e.g., C standard library) that may provide functions such as memory allocation functions, string manipulation functions, mathematic functions, and the like. In addition, the libraries 1206 may include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1206 may also include a wide variety of other libraries 1234 to provide many other APIs to the applications 1210.

The frameworks 1208 provide a high-level common infrastructure that may be utilized by the applications 1210, according to some implementations. For example, the frameworks 1208 provide various graphic user interface (GUI) functions, high-level resource management, high-level location services, and so forth. The frameworks 1208 may provide a broad spectrum of other APIs that may be utilized by the applications 1210, some of which may be specific to a particular operating system or platform.

In an example, the applications 1210 include a home application 1250, a contacts application 1252, a browser application 1254, a book reader application 1256, a location application 1258, a media application 1260, a messaging application 1262, a game application 1264, and a broad assortment of other applications such as a third-party application 1266. According to some examples, the applications 1210 are programs that execute functions defined in the programs. Various programming languages may be employed to create one or more of the applications 1210, structured in a variety of manners, such as object-orientated programming languages (e.g., Objective-C, Java, or C++) or procedural programming languages (e.g., C or assembly language). In a specific example, the third-party application 1266 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1266 may invoke the API calls 1212 provided by the mobile operating system (e.g., the operating system 1204) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a “cloud computing” environment or as a “software as a service” (SaaS). For example, at least some of the operations may be performed by a group of computers (as examples of machines including processors), these operations being accessible via the network 106 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

Figure 13:
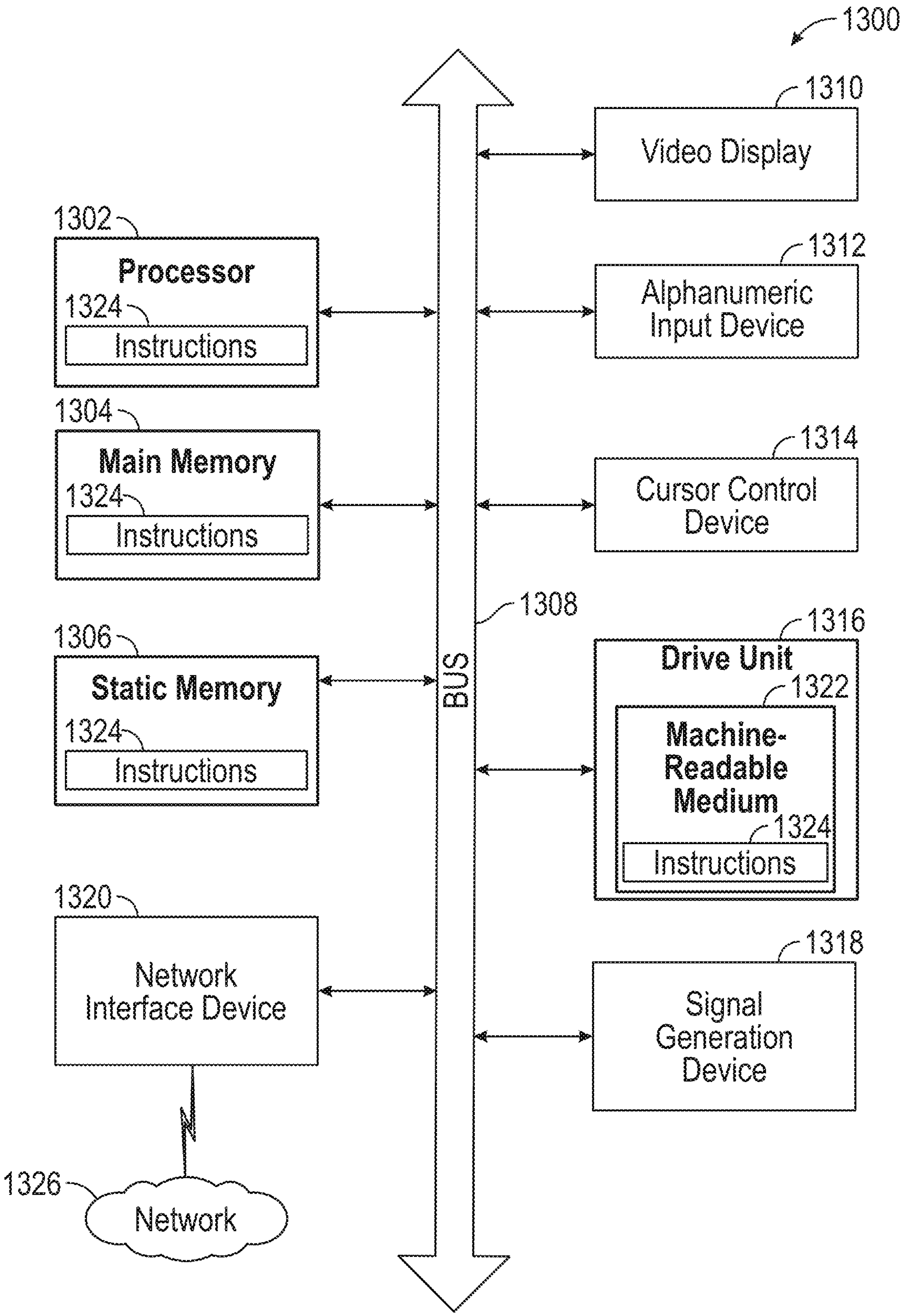
FIG. 13 illustrates a device that can be used to implement exemplary examples of the present disclosure.

FIG. 13 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term “machine” shall also be taken to include any collection of machines that, individually or jointly, execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 610 (e.g., a liquid crystal display (LCD) or a cathode ray tube (CRT)). The computer system 1300 also includes an alphanumeric input device 1312 (e.g., a keyboard), a user interface (UI) navigation device (cursor control device) 1314 (e.g., a mouse), a disk drive unit 1316, a signal generation device 1318 (e.g., a speaker) and a network interface device 1320.

The drive unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 900, the main memory 1304 and the processor 1302 also constituting machine-readable media. Instructions 1324 may also reside within the static memory 1306.

While the machine-readable medium 1322 is shown in an example to be a single medium, the term "machine-readable medium" may include a single medium or multiple media (e.g., a centralized or distributed database, and/or associated caches and servers) that store the one or more instructions or data instructions 1324. The term "machine-readable medium" shall also be taken to include any tangible medium that is capable of storing, encoding or carrying instructions 1324 for execution by the machine and that cause the machine to perform any one or more of the methodologies of the present invention, or that is capable of storing, encoding or carrying data structures utilized by or associated with such instructions 1324. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 1324 for execution by the machine, and includes digital or analog communications signals or other intangible media to facilitate communication of such software.

In various example examples, one or more portions of the network 1326 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1326 or a portion of the network 1326 may include a wireless or cellular network, and where a coupling may be a Code Division Multiple Access (CDMA) connection, a Global System for Mobile communications (GSM) connection, or another type of cellular or wireless coupling. In this example, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72 (b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A system comprising:

processing circuitry; and a memory device including instructions embodied thereon, wherein the instructions, which when executed by the processing circuitry, configure the processing circuitry to perform operations that:

receive, via a network interface device, a first metric associated with a social media user during a first time period, the first metric being associated with an article used by the social media user;

compare the first metric with a plurality of thresholds, wherein the plurality of thresholds include:

a first threshold corresponding to outperforming a benchmark by a first threshold percentage; and a second threshold corresponding to outperforming the benchmark by a second threshold percentage greater than the first threshold percentage;

assign a first variable indicium to the social media user based on the comparison of the first metric with the plurality of thresholds, wherein the first variable indicium varies with the first threshold and the second threshold;

provide training data having features, including historical performance metric data associated with the social media user, to a neural network architecture to create the first variable indicium;

update the neural network architecture over time with additional variable indicium by:

implementing fuzzy matching algorithms that use a blend of probabilistic, heuristic, linguistic, phonetic, and empirical methods based on a type of data being matched;

determining machine-learned weights for features during training and validation, the machine-learned weights including a first weight for a first feature of the features and a second weight for a second feature of the features, wherein the first weight has a first value that correlates to a first predictive power having a value below a first predetermined threshold;

removing the first feature from the training data based on the first predictive power being below the first predetermined threshold;

retaining the second feature in the training data when the second weight has a second value that correlates to a second predictive power greater than the first predictive power and a value at or above a second predetermined threshold; and increasing a speed of a process of training future models and computing output scores by removing features with the first predictive power from the training data, thereby reducing computational load in subsequent processing;

retrain the neural network architecture based on historical performance trends to enhance accuracy by providing the neural network architecture with updated training data relating to changed achievement levels when users achieve a particular achievement level, thereby causing the neural network architecture to reassign threshold values associated with each achievement level;

create a second variable indicium using the neural network architecture wherein the second variable indicium represents an updated social media user certification level;

generate a forward-facing element that is engageable to view articles used by the social media user to achieve the first metric using the retrained neural network architecture, wherein generating the forward-facing element comprises generating at least one of:

a quick response (OR) code using a QR code generator that employs application programming interfaces to automatically fuse and encode data into graphic designs; or a hyperlink implemented using a hypertext system that implements a presentation level, a hypertext abstract machine level, and a database level;

transmit, via the network interface device, the first variable indicium and the forward-facing element to a social media platform server associated with the social media user for display on a profile page of the social media user hosted by the social media platform server;

receive, from the social media platform server, a selection input indicating that a follower of the social media user has selected the forward-facing element on the profile page;

in response to the selection input, redirect the follower from the profile page hosted by the social media platform server to a user interface that lists the articles used by the social media user to achieve the first metric wherein the user interface displays the social media user certification level;

provide a performance metric of the social media user;

provide adjustable elements that correspond to the listed articles listed on the user interface, a first size of a first article of the articles corresponding to a first magnitude of the first article in comparison to a second magnitude of a second article of the articles, wherein adjustment of a configuration the first article on the user interface changes the first magnitude and the second magnitude and updates the displayed social media user certification level;

receive an adjustment of the first article configuration; and change a configuration of a second article on the user interface in proportion to the adjustment of the first article configuration and the change in the first magnitude and the second magnitude wherein the proportional change maintains a consistent relationship between article configurations and the updated social media user certification level; and update the performance metric displayed on the user interface in real-time based on the adjustment of the first article configuration and the proportional change to the configuration of the second article.

2. A non-transitory, machine-readable medium, comprising instructions, which when performed by a processor of a machine, causes the processor to perform operations to:

receive, via a network interface device, a first metric associated with a social media user during a first time period, the first metric being associated with an article used by the social media user;

compare the first metric with a plurality of thresholds, wherein the plurality of thresholds include:

a first threshold corresponding to outperforming a benchmark by a first threshold percentage; and a second threshold corresponding to outperforming the benchmark by a second threshold percentage greater than the first threshold percentage;

assign a first variable indicium to the social media user based on the comparison of the first metric with the plurality of thresholds, wherein the first variable indicium varies with the first threshold and the second threshold;

provide training data having features, including historical performance metric data associated with the social media user, to a neural network architecture to create the first variable indicium;

update the neural network architecture over time with additional variable indicium by:

implementing fuzzy matching algorithms that use a blend of probabilistic, heuristic, linguistic, phonetic, and empirical methods based on a type of data being matched;

determining machine-learned weights for features during training and validation, the machine-learned weights including a first weight for a first feature of the features and a second weight for a second feature of the features, wherein the first weight has a first value that correlates to a first predictive power having a value below a first predetermined threshold;

removing the first feature from the training data based on the first predictive power being below the first predetermined threshold;

retaining the second feature in the training data when the second weight has a second value that correlates to a second predictive power greater than the first predictive power and a value at or above a second predetermined threshold; and increasing a speed of a process of training future models and computing output scores by removing features with the first predictive power from the training data, thereby reducing computational load in subsequent processing;

retrain the neural network architecture based on historical performance trends to enhance accuracy by providing the neural network architecture with updated training data relating to changed achievement levels when users achieve a particular achievement level, thereby causing the neural network architecture to reassign threshold values associated with each achievement level;

create a second variable indicium using the neural network architecture wherein the second variable indicium represents an updated social media user certification level;

generate a forward-facing element that is engageable to view articles used by the social media user to achieve the first metric using the retrained neural network architecture, wherein generating the forward-facing element comprises generating at least one of:

a quick response (OR) code using a QR code generator that employs application programming interfaces to automatically fuse and encode data into graphic designs; or a hyperlink implemented using a hypertext system that implements a presentation level, a hypertext abstract machine level, and a database level;

transmit, via the network interface device, the first variable indicium and the forward-facing element to a social media platform server associated with the social media user for display on a profile page of the social media user hosted by the social media platform server:

receive, from the social media platform server, a selection input indicating that a follower of the social media user has selected the forward-facing element on the profile page;

in response to the selection input, redirect the follower from the profile page hosted by the social media platform server to a user interface that lists the articles used by the social media user to achieve the first metric wherein the user interface displays the social media user certification level;

provide a performance metric of the social media user;

provide adjustable elements that correspond to the listed articles listed on the user interface, a first size of a first article of the articles corresponding to a first magnitude of the first article in comparison to a second magnitude of a second article of the articles, wherein adjustment of a configuration the first article on the user interface changes the first magnitude and the second magnitude and updates the displayed social media user certification level;

receive an adjustment of the first article configuration; and change a configuration of a second article on the user interface in proportion to the adjustment of the first article configuration and the change in the first magnitude and the second magnitude wherein the proportional change maintains a consistent relationship between article configurations and the updated social media user certification level; and update the performance metric displayed on the user interface in real-time based on the adjustment of the first article configuration and the proportional change to the configuration of the second article.

3. A method comprising:

receiving, via a network interface device, a first metric associated with a social media user during a first time period, the first metric being associated with an article used by the social media user;

comparing the first metric with a plurality of thresholds, wherein the plurality of thresholds include:

a first threshold corresponding to outperforming a benchmark by a first threshold percentage; and a second threshold corresponding to outperforming the benchmark by a second threshold percentage greater than the first threshold percentage;

assigning a first variable indicium to the social media user based on the comparison of the first metric with the plurality of thresholds, wherein the first variable indicium varies with the first threshold and the second threshold;

providing training data having features, including historical performance metric data associated with the social media user, to a neural network architecture to create the first variable indicium;

updating the neural network architecture over time with additional variable indicium by:

implementing fuzzy matching algorithms that use a blend of probabilistic, heuristic, linguistic, phonetic, and empirical methods based on a type of data being matched;

determining machine-learned weights for features during training and validation, the machine-learned weights including a first weight for a first feature of the features and a second weight for a second feature of the features, wherein the first weight has a first value that correlates to a first predictive power having a value below a first predetermined threshold;

removing the first feature from the training data based on the first predictive power being below the first predetermined threshold;

retaining the second feature in the training data when the second weight has a second value that correlates to a second predictive power greater than the first predictive power and a value at or above a second predetermined threshold; and increasing a speed of a process of training future models and computing output scores by removing features with the first predictive power from the training data, thereby reducing computational load in subsequent processing;

retraining the neural network architecture based on historical performance trends to enhance accuracy by providing the neural network architecture with updated training data relating to changed achievement levels when users achieve a particular achievement level, thereby causing the neural network architecture to reassign threshold values associated with each achievement level;

creating a second variable indicium using the neural network architecture wherein the second variable indicium represents an updated social media user certification level;

generating a forward-facing element that is engageable to view articles used by the social media user to achieve the first metric using the retrained updated neural network architecture, wherein generating the forward-facing element comprises generating at least one of:

a quick response (OR) code using a QR code generator that employs application programming interfaces to automatically fuse and encode data into graphic designs; or a hyperlink implemented using a hypertext system that implements a presentation level, a hypertext abstract machine level, and a database level;

transmit, via the network interface device, the first variable indicium and the forward-facing element to a social media platform server associated with the social media user for display on a profile page of the social media user hosted by the social media platform server;

receive, from the social media platform server, a selection input indicating that a follower of the social media user has selected the forward-facing element on the profile page:

element in response to the selection input, redirecting the follower from the profile page hosted by the social media platform server to a user interface that lists the articles used by the social media user to achieve the first metric wherein the user interface displays the social media user certification level;

providing a performance metric of the social media user;

providing adjustable elements that correspond to the listed articles listed on the user interface, a first size of a first article of the articles corresponding to a first magnitude of the first article in comparison to a second magnitude of a second article of the articles, wherein adjustment of a configuration the first article on the user interface changes the first magnitude and the second magnitude and updates the displayed social media user certification level;

receiving an adjustment of the first article configuration; and changing a configuration of a second article on the user interface in proportion to the adjustment of the first article configuration and the change in the first magnitude and the second magnitude wherein the proportional change maintains a consistent relationship between article configurations and the updated social media user certification level; and updating the performance metric displayed on the user interface in real-time based on the adjustment of the first article configuration and the proportional change to the configuration of the second article.

4. The system of claim 1, wherein the instructions further configure the processing circuitry to perform operations that:

receive a second metric associated with the social media user during a second time period different from the first time period; and automatically change the first variable indicium to the second variable indicium in response to the second metric being different from the first metric, wherein the change from the first variable indicium to the second variable indicium corresponds to a change in achievement level of the social media user.

5. The system of claim 1, wherein the plurality of thresholds further includes a third threshold corresponding to outperforming the benchmark by a third threshold percentage greater than the second threshold percentage, and wherein a third variable indicium corresponds to the third threshold.

6. The system of claim 1, wherein the neural network architecture comprises at least one of a linear regression model, a logistic regression model, a random forest model, a naive Bayes model, or a support vector machine.

7. The system of claim 1, wherein the instructions further configure the processing circuitry to perform operations that receive, from the follower via the user interface, a financial knowledge rating selected from a plurality of financial knowledge inputs ranging from a lowest financial knowledge level to a highest financial knowledge level.

8. The system of claim 1, wherein the instructions further configure the processing circuitry to perform operations that:

receive a selection of one of a selectable indicia associated with a first ranked user; and in response to the selection, display a portfolio of the first ranked user comprising a distribution of articles in the portfolio of the first ranked user where the portfolio of the first ranked user further comprises a selectable indication of a financial advisor used by the first ranked user, and wherein selection of the selectable indication initiates contact with the financial advisor.

9. The system of claim 1, wherein the instructions further configure the processing circuitry to perform operations that:

store the first variable indicium in at least one of an internal database or an external database;

associate the first variable indicium with the first metric for the social media user in the at least one of the internal database or the external database; and store, in at least one of an internal database or an external database, data for the social media user comprising the article used by the social media user and the first metric associated with the article.

10. The non-transitory, machine-readable medium of claim 2, wherein the instructions further cause the processor to perform operations to:

receive a second metric associated with the social media user during a second time period different from the first time period; and automatically change the first variable indicium to the second variable indicium in response to the second metric being different from the first metric, wherein the change from the first variable indicium to the second variable indicium corresponds to a change in achievement level of the social media user.

11. The non-transitory, machine-readable medium of claim 2, wherein the plurality of thresholds further includes a third threshold corresponding to outperforming the benchmark by a third threshold percentage greater than the second threshold percentage, and wherein a third variable indicium corresponds to the third threshold.

12. The non-transitory, machine-readable medium of claim 2, wherein the neural network architecture comprises at least one of a linear regression model, a logistic regression model, a random forest model, a naive Bayes model, or a support vector machine.

13. The non-transitory, machine-readable medium of claim 2, wherein the instructions further cause the processor to perform operations to receive, from the follower via the user interface, a financial knowledge rating selected from a plurality of financial knowledge inputs ranging from a lowest financial knowledge level to a highest financial knowledge level.

14. The non-transitory, machine-readable medium of claim 2, wherein the instructions further cause the processor to perform operations to:

receive a selection of one of a selectable indicia associated with a first ranked user; and in response to the selection, display a portfolio of the first ranked user comprising a distribution of articles in the portfolio of the first ranked user where the portfolio of the first ranked user further comprises a selectable indication of a financial advisor used by the first ranked user, and wherein selection of the selectable indication initiates contact with the financial advisor.

15. The non-transitory, machine-readable medium of claim 2, wherein the instructions further cause the processor to perform operations to:

store the first variable indicium in at least one of an internal database or an external database;

associate the first variable indicium with the first metric for the social media user in the at least one of the internal database or the external database; and store, in at least one of an internal database or an external database, data for the social media user comprising the article used by the social media user and the first metric associated with the article.

16. The method of claim 15, wherein the method further comprises:

receiving a second metric associated with the social media user during a second time period different from the first time period; and automatically changing the first variable indicium to the second variable indicium in response to the second metric being different from the first metric, wherein the change from the first variable indicium to the second variable indicium corresponds to a change in achievement level of the social media user.

17. The method of claim 15, wherein the plurality of thresholds further includes a third threshold corresponding to outperforming the benchmark by a third threshold percentage greater than the second threshold percentage, and wherein a third variable indicium corresponds to the third threshold.

18. The method of claim 15, wherein the neural network architecture comprises at least one of a linear regression model, a logistic regression model, a random forest model, a naive Bayes model, or a support vector machine.

19. The method of claim 15, wherein the method further comprises receiving, from the follower via the user interface, a financial knowledge rating selected from a plurality of financial knowledge inputs ranging from a lowest financial knowledge level to a highest financial knowledge level.

20. The method of claim 15, wherein the method further comprises:

receiving a selection of one of a selectable indicia associated with a first ranked user; and in response to the selection, displaying a portfolio of the first ranked user comprising a distribution of articles in the portfolio of the first ranked user where the portfolio of the first ranked user further comprises a selectable indication of a financial advisor used by the first ranked user, and wherein selection of the selectable indication initiates contact with the financial advisor.

21. The method of claim 15, wherein the method further comprises:

storing the first variable indicium in at least one of an internal database or an external database;

associating the first variable indicium with the first metric for the social media user in the at least one of the internal database or the external database; and storing, in at least one of an internal database or an external database, data for the social media user comprising the article used by the social media user and the first metric associated with the article.

* * * * *